Patented Feb. 12, 1924.

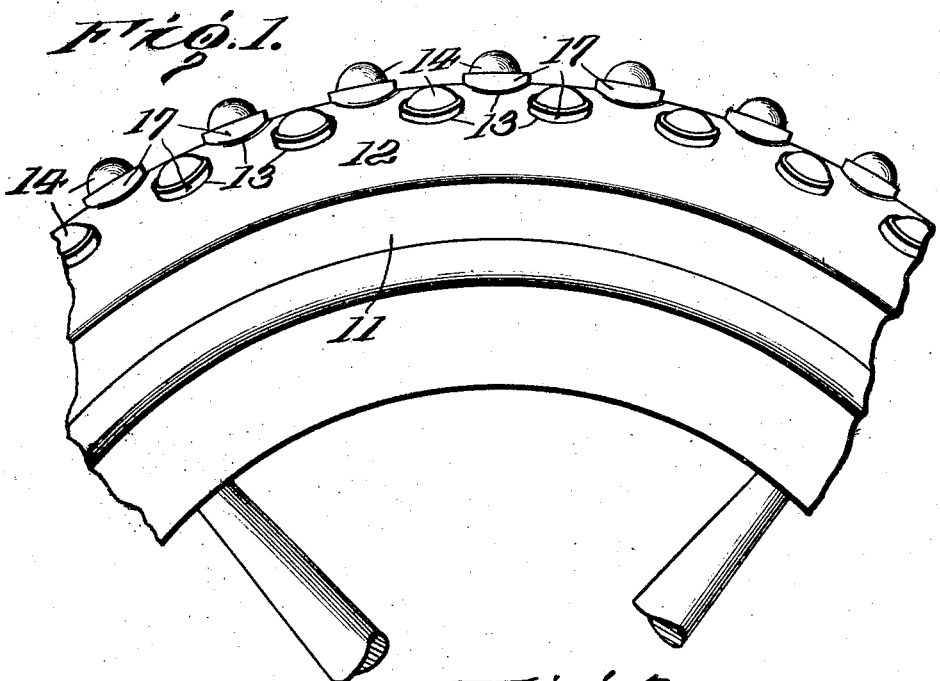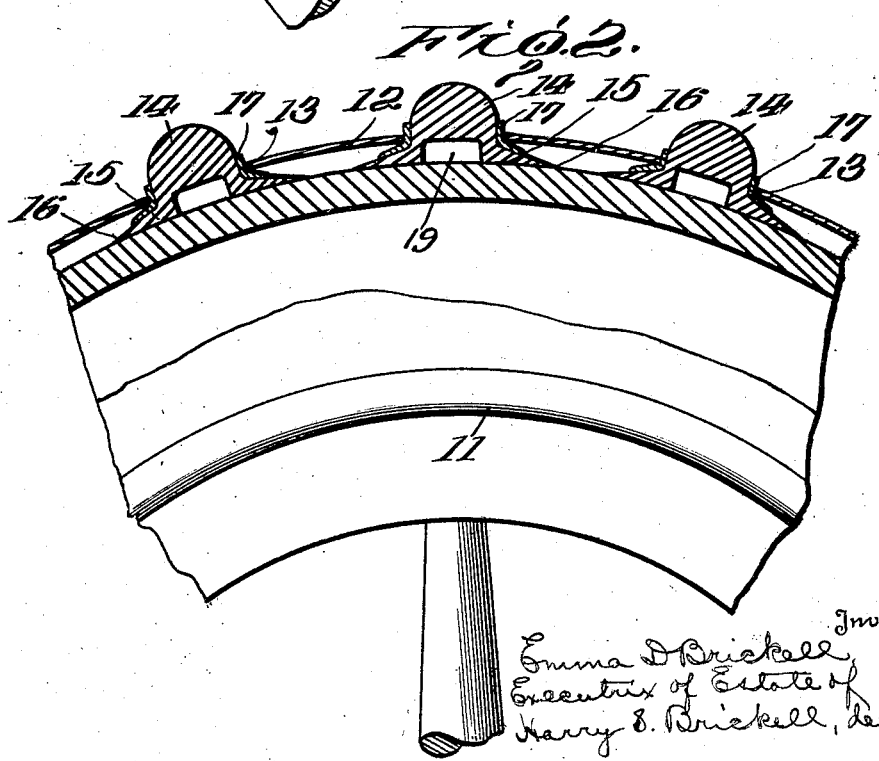

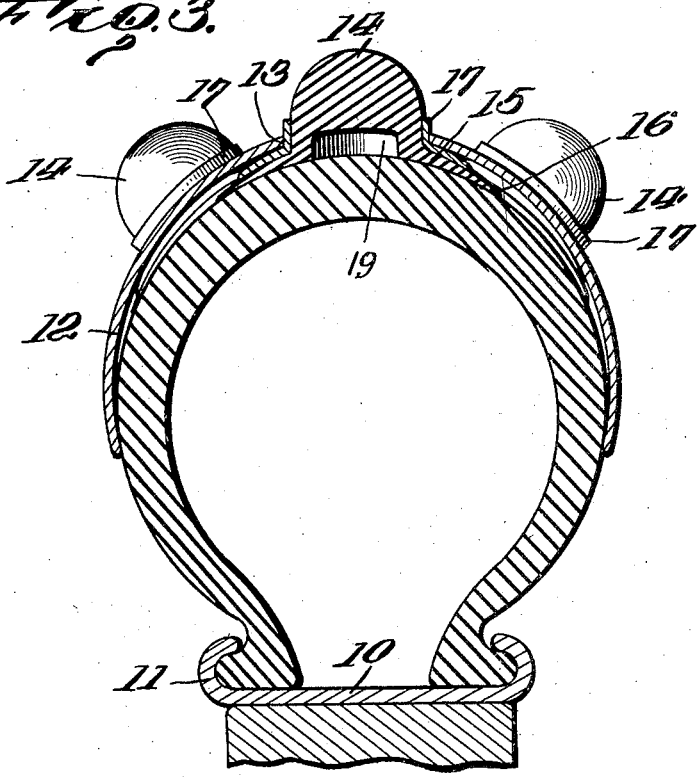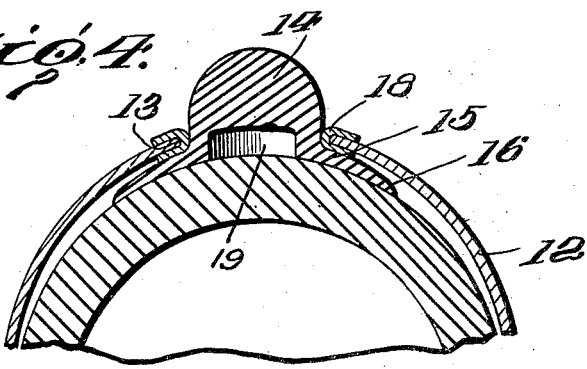

1,483,773

UNITED STATES PATENT OFFICE.

HARRY S. BRICKELL, DECEASED, LATE OF PITTSBURGH, PENNSYLVANIA; BY EMMA D. BRICKELL, EXECUTRIX, OF PITTSBURGH, PENNSYLVANIA, ASSIGNOR TO SAID EMMA D. BRICKELL, OF PITTSBURGH, PENNSYLVANIA.

ANTISKID WEAR-RESISTING ARMOR FOR TIRES.

Application filed January 7, 1920. Serial No. 350,005.

*To all whom it may concern:*

Be it known that HARRY S. BRICKELL, deceased, late a citizen of the United States, residing at Pittsburgh, in the county of Allegheny and State of Pennsylvania, has invented a new and useful Antiskid Wear-Resisting Armor for Tires, of which the following is a specification.

This invention is a device capable of external attachment to a vehicle tire for the purpose of protecting the latter from wear and for reducing the tendency to skid on slippery roadways.

One of the objects of the invention is to provide a device of the character mentioned which may be secured in position over the tread of a vehicle tire, for the purpose of protecting the said tire from wear, punctures, and cuts, without impairing its resiliency. A further object is to provide a wear-resisting anti-skid device having means whereby it may be readily attached to or detched from a vehicle tire, and provided with protuberances removably retained in position, so that they may be readily replaced when worn or injured, their inner surfaces being shaped to the contour of the tire and provided with recesses therein of the nature of vacuum cups, which not only protect the tire from wear but also prevent displacement of the wear-resisting antiskid elements while in use.

The invention will be hereinafter fully set forth and particularly pointed out in the claims.

In the accompanying drawings:—

Figure 1 is a side elevation of a portion of a tire equipped with a protecting device constructed in accordance with the invention. Figure 2 is a longitudinal sectional view. Figure 3 is a transverse sectional view. Figure 4 is a view illustrating a slight modification.

Referring to the drawings, 10 designates a wheel rim, which may be of any desired type, provided with the usual flanges to receive and retain a tire 11, of any usual or preferred construction, a common form of pneumatic tire being shown in the drawings for purpose of illustration.

The protecting and anti-skid device comprises a casing 12, made of thin sheet metal or any other material capable of resisting wear, cuts and punctures, said casing being of concavo-convex cross section to conform to the contour of the tire which is enclosed thereby, as shown. Thin spring brass is an excellent material of which to construct the casing 12, because it may be made to conform to the shape of the tire and may be retained in place by the tire when the latter is inflated without using attaching devices, although such devices may be used if desired.

The casing 12 is provided with openings 13, through which project knob-like tread members 14, of any suitable shape and size, provided with flanges 15 shaped to conform to the contour of the tire, and preferably tapered to a comparatively thin edge as indicated at 16, said flanges extending between the walls of the casing 12 and the body of the tire 11. In order to prevent shearing off of the tread members by the edges of the openings 13, protecting collars 17 are interposed between said tread members and said edges, each protecting collar having a flange which aids in retaining it in position. Or if desired, the sharp edges of the holes may be covered by grommets 18, as illustrated in Figure 4.

In practice, any number of tread members 14 may be employed and they may be araged over the tire tread to conform to any desired design. It is preferred to provide them with recesses 19, in their inner sides, in the nature of vacuum cups, to reduce wear on the surface of the tire and to prevent displacement of the casing 12.

In placing the protecting device in position the tread members 14 are passed through their respective openings and the protector casing 12 is then fitted around the tire, while the latter is deflated to reduce its diameter. When all of the parts are in place, and the tire has been inflated, the wheel will travel upon the tread members 14, protecting the tread of the tire from practically all road wear, and said members will also act to prevent skidding of the vehicle on slippery roads. The vacuum cups 19 cause the said tread members to have a non-slip engagement with the tire and by reason of this engagement prevent lateral and longitudinal creeping of casing 12. When any of said tread members become so injured or worn out that they are no longer useful, they may be readily replaced after first disconnecting the protector member 12. When a new tread member has been substituted the protector member may be restored to position, an operation which will require but little time and practically no labor.

The advantages of the invention are obvious. It will be seen for instance, that the expense of renewing tires will be reduced to a minimum. Tires will not wear out quickly, and therefore the likelihood of blow outs is greatly reduced. The protecting cover may be applied to any form of tire now in use and will prevent punctures and cuts, all without impairing the resiliency at present obtained in the tire, because the protuberances play within the holes in the protector casing and bear upon the pneumatic cushion provided by the tire.

Having thus explained the nature of the invention and described an operative manner of constructing and using the same, although without attempting to set forth all of the forms in which it may be made or all of the forms of its use, what is claimed is:—

1. A wear-resisting anti-skid device of the character described comprising a protector casing shaped to be retained in position around an inflated tire by the expansion of the latter, and a plurality of independent tread members projecting through said casing and having their inner portions shaped to engage the surface of a tire and provided with suction recesses.

2. A wear-resisting anti-skid device of the character described comprising a protector casing shaped to be retained in position around an inflated tire by the expansion of the latter, and a plurality of independent tread members projecting through said casing and having tire-engaging suction recesses and approximately circular tire-engaging flanges concentric with said recesses.

3. A wear-resisting anti-skid device of the character described comprising a protector casing, and a plurality of tread members projecting through said casing and having their inner portions shaped to engage the surface of a tire and provided with means co-operating with said tire surface for resisting displacement, and means for protecting said tread members from the shearing action of the protector casing.

4. A wear-resisting anti-skid armour for tires comprising a protector casing having openings therein, tread members projecting through said openings and having inner tire-engaging flanges and also having means co-operating with said tire surface for resisting displacement and collars surrounding said projecting tread members and having flanges bearing against the flanges of the tread members.

5. A wear-resisting anti-skid armour for tires comprising a protector casing of concavo-convex cross section provided with openings and knob-like tread members projecting through said openings and approximately hemi-spherical having inner flexible flanges bearing against and conforming to the contour of the tire for securing the said members in position over the tire.

6. A wear-resisting anti-skid armour for tires comprising a protector casing of concavo-convex cross section provided with openings, knob-like tread members projecting through said openings and having inner flexible flanges bearing against and conforming to the contour of the tire, and collars surrounding the projecting portions of said tread members and having flanges interposed between the protector casing and the flanges of the tread members.

7. An auxiliary shoe member of substantially crescent shaped cross section adapted to be removably applied to a pneumatic casing having a plurality of removable plugs mounted therein and projecting therefrom and comprising the tread thereof, the inner faces of said plugs having vacuum cups formed therein for producing a suction between the plugs and the casing.

8. An auxiliary shoe adapted to be removably applied to the outside of a pneumatic tire casing and having a substantially crescent shaped cross section, a plurality of holes therethru, replaceable resilient plugs mounted in said holes and extending out beyond the outer surface of said shoe, the inner ends of said plugs being of greater area than the outer ends to prevent them from being removed outwardly, and vacuum cups on the inner ends of said plugs to hold the same in firm engagement with the tire casing.

In testimony whereof I, as executrix of the estate of HARRY S. BRICKELL, have hereunto set my hand.

EMMA D. BRICKELL,
*Executrix of Harry S. Brickell, deceased.*